United States Patent [19]

Fletcher et al.

[11] 4,068,763

[45] Jan. 17, 1978

[54] WRIST JOINT ASSEMBLY

[76] Inventors: James C. Fletcher, Administrator of the National Aeronautics and Space Administration, with respect to an invention of; Leendert Kersten, Lincoln, Nebr.; James D. Johnston, Madison, Ala.

[21] Appl. No.: 708,800

[22] Filed: July 26, 1976

[51] Int. Cl.² ............................................. B25J 3/00
[52] U.S. Cl. ................................. 214/1 CM; 3/12.5; 74/515 E
[58] Field of Search ............ 214/1 CM, 1 BC, 1 BH, 214/1 BD, 1 BV, 147 T, 1 R; 74/515 E; 3/12–12.8

[56] References Cited

U.S. PATENT DOCUMENTS

| | | | |
|---|---|---|---|
| 3,043,448 | 7/1962 | Melton | 214/1 CM |
| 3,451,224 | 6/1969 | Colechia et al. | 214/1 CM X |
| 3,849,668 | 11/1974 | Dane | 214/1 CM X |
| 3,922,930 | 12/1975 | Fletcher et al. | 214/1 CM X |

*Primary Examiner*—Frank E. Werner

*Attorney, Agent, or Firm*—L. D. Wofford, Jr.; J. H. Beumer; John R. Manning

[57] ABSTRACT

A wrist joint assembly is provided for use with a mechanical manipulator arm for finely positioning an end-effector carried by the wrist joint on the terminal end of the manipulator arm wherein the wrist joint assembly is pivotable about a first axis to produce a yaw motion, a second axis to produce a pitch motion, and a third axis to produce a roll motion, wherein the three axes are mutually perpendicular and have a common point of origin. The wrist joint assembly includes a disk segment affixed to the terminal end of the manipulator arm and a first housing member rotatably carried on the disk segment about the first axis. A second housing member is rotatably carried on the first housing member and a third housing member is rotatably carried on the second housing member whereby the third housing member and the mechanical end-effector carried thereon are moved in the yaw, pitch, and roll motion. Drive means are provided for rotating each of the housings about their respective axis which includes a cluster of miniature motors having spur gears carried on the output drive shaft thereof which mesh with a center drive gear affixed on the housing to be rotated.

13 Claims, 9 Drawing Figures

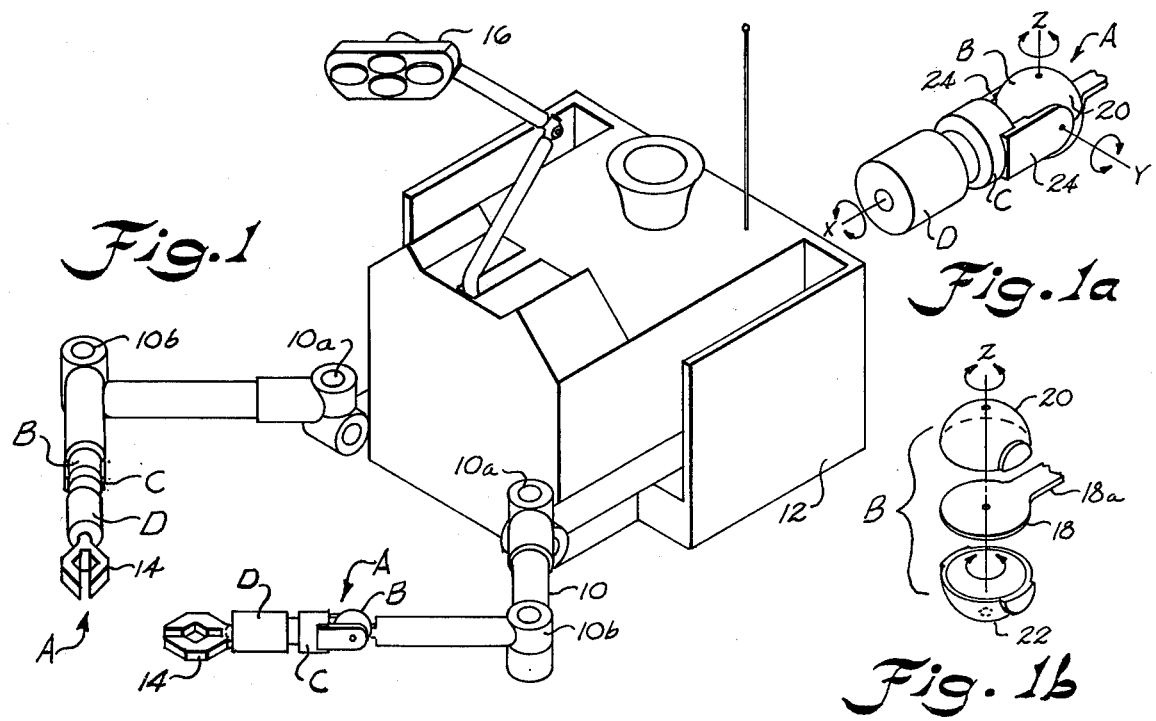
Fig. 1
Fig. 1a
Fig. 1b
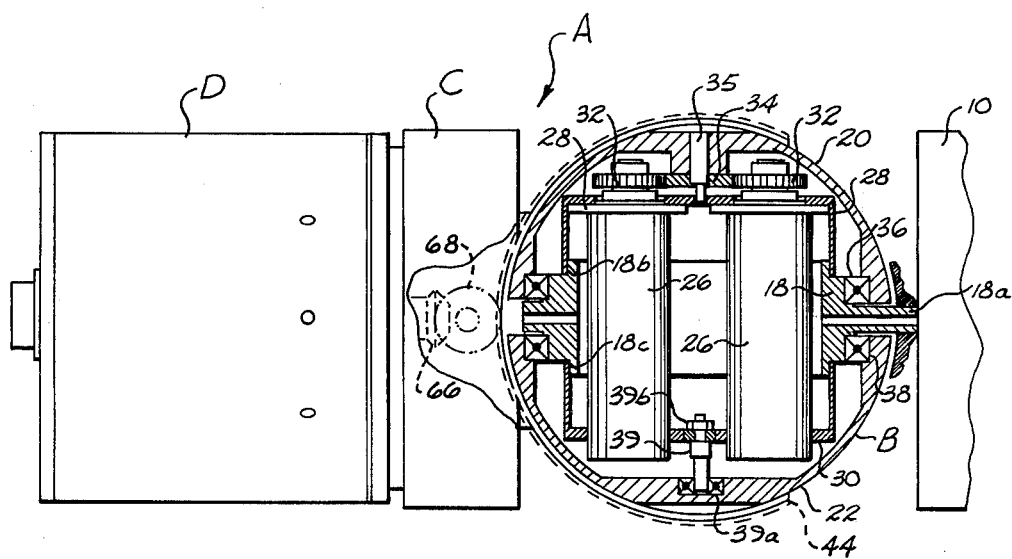
Fig. 3

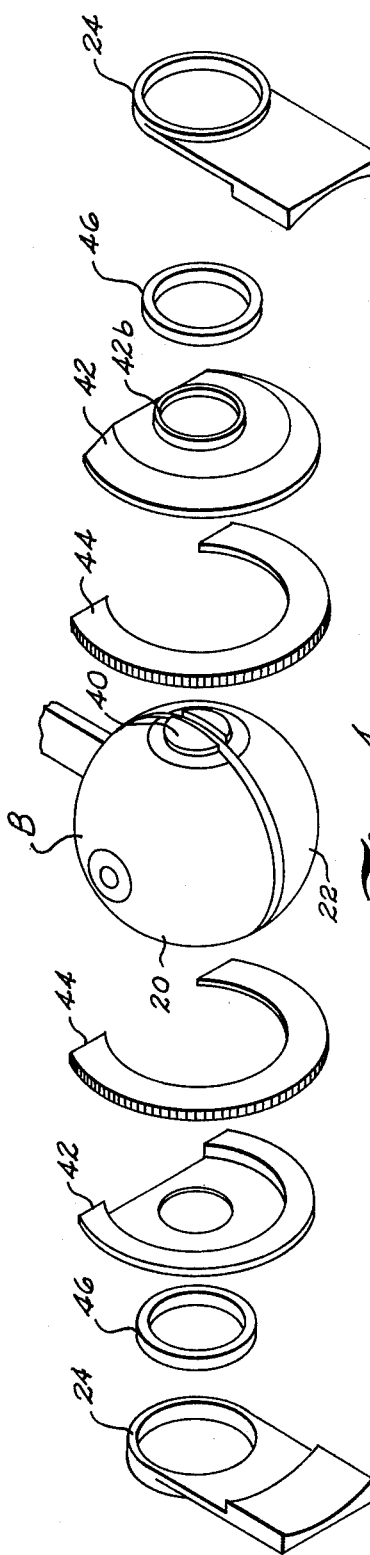
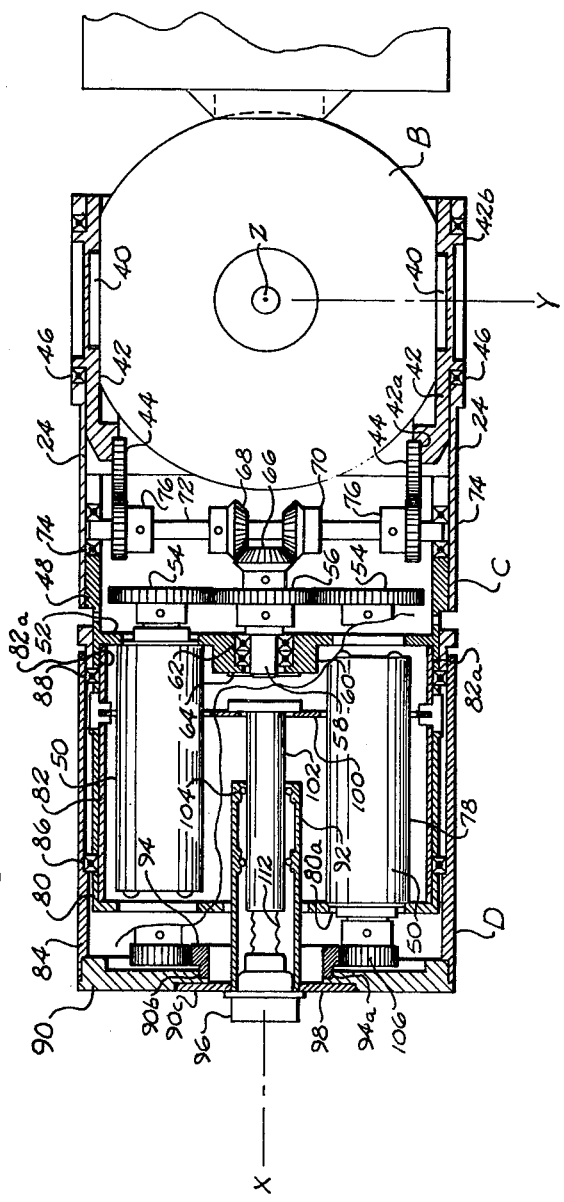
Fig. 4
Fig. 5

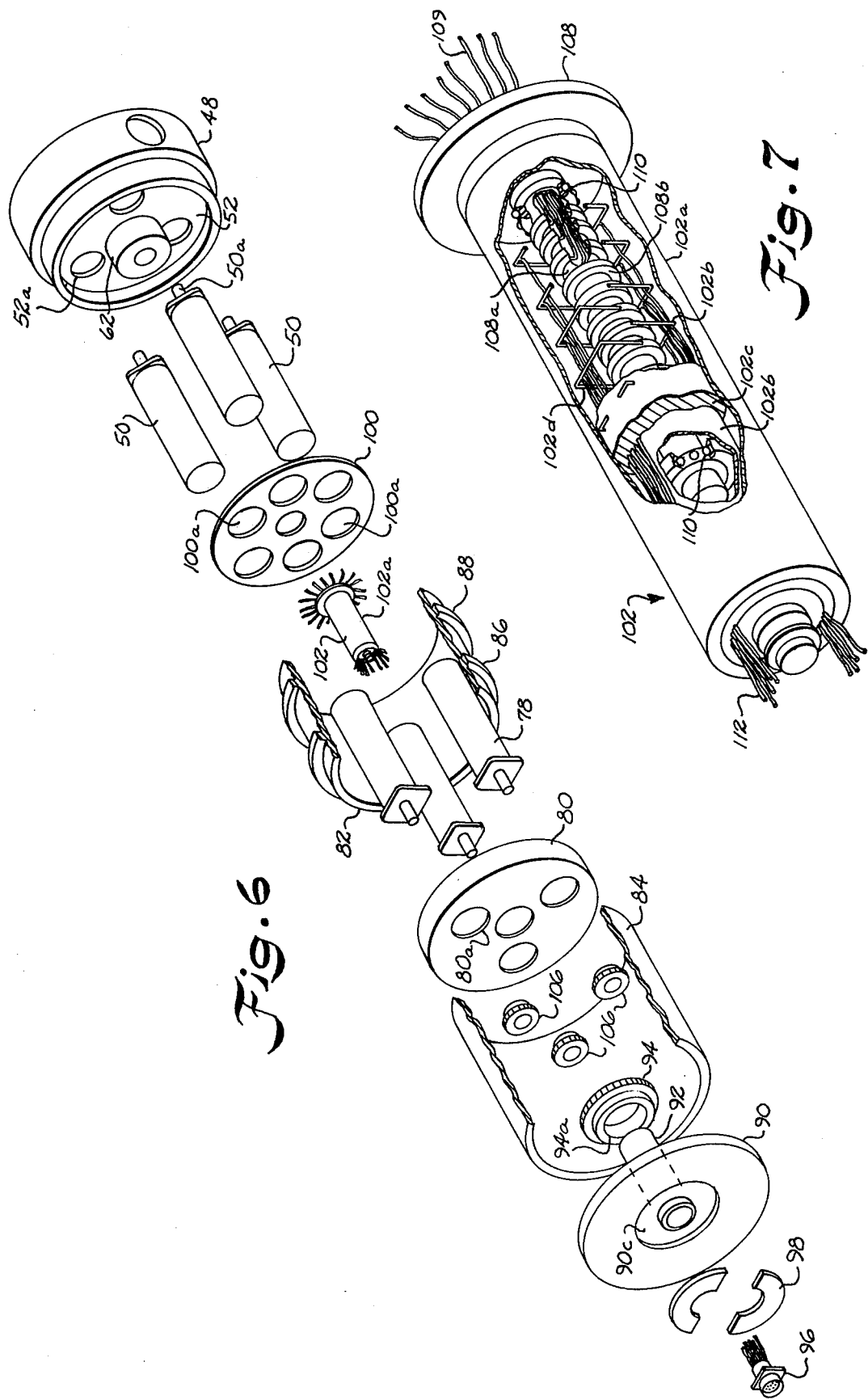

4,068,763

WRIST JOINT ASSEMBLY

ORIGIN OF THE INVENTION

The invention described herein was made in the performance of work under a NASA contract and is subject to the provisions of Section 305 of the National Aeronautics and Space Art of 1958, Public Law 85-568 (72 Stat. 435; 412 U.S.C.2457).

BACKGROUND OF THE INVENTION

Mechanical manipulator arms terminating in some type of mechanical hand or gripping device (end-effector) are commonly employed on space vehicles for performing planetary explorations, and satellite and space shuttle operations. The manipulator arms and the joints thereof together with the end-effector are usually remotely controlled by a closed-loop guidance system commonly known as a teleoperator. Teleoperators normally include a guidance loop having an electronic eye device such as stereo television and a man in the loop to remotely control the manipulator arm and hand through motorized pivot joints.

During the past several years an increased effort in manipulator design has been directed mainly toward the actual control of the manipulator with or without the attached end-effectors in order to perform special tasks from a remote position. As important as this research is, it should be realized that the degree of control sophistication is directly proportional to the degree of manipulator joint and end-effector sophistication.

It seems that enough effort has not been directed to the design and improvement of the various joints, their drives and their configurations. The practice of present day equipment-designers seems to point to the separation of yaw, pitch and roll motion by physical distances, especially in the wrist joint located at the terminal end of the manipulator arm upon which the end-effector is carried. This practice makes the solution of the mathematical equation, which defines the relative position of the terminal end of the manipulator and which is utilized in the control system, a rather difficult task.

Also, past joint designs have resulted in several configurations of acceptable, small physical shape but which show externally applied drive and several mechanisms. These devices thus nullify the objective of improved visibility around the joint.

For space application the joints with bulky configurations cannot be accepted since many tasks will have to be performed in the "shadow-side" and requiring illumination from sources on the teleoperator. These requirements demand a maximum of visibility.

In many present day designs of manipulator arms the wrist joint configuration has been simplified to the degree that not three but two motions occur in the wrist joint whereas the third motion is supplied by the shoulder of the manipulator arm or is completely ignored altogether. For those arms that have three degrees of freedom in the wrist joint, the actual configurations produce, in some cases, a very bulky joint which does not provide for the required visibility referred to above.

The task at present is to design a wrist joint assembly which is better than what is currently available yet conforms to the rules of sound kinematic manipulator design. The present invention provides such a new device which has been successfully demonstrated.

SUMMARY OF THE INVENTION

The invention relates to a wrist joint assembly used with a mechanical manipulator arm for moving and finely positioning an end-effector such as mechanical hand carried by a wrist joint on the terminal end of the manipulator arm. The wrist joint assembly includes a disk segment having an outwardly extending arm affixed to the terminal end of a manipulator arm, and a first housing member having a pair of shell members rotatably carried on the disk segment. A first drive means is provided for rotating the first housing member about a first axis coinciding with the axis of the disk segment to produce a yaw motion.

A second housing member is rotatably carried by said first housing member pivotable about a second axis extending through the first housing member and normal to the first axis. A second drive means is connected between the second and first housing members for rotating the second housing member about the second axis to produce a pitch motion. The second housing is moved in both the yaw and pitch motions.

A third housing member is rotatably carried by the second housing member about a third axis normal to the plane of the first and second axes so that the first, second and third axis are mutually normal to each other and have a common point of origin. A third drive means is connected between the third and second housings for rotating the third housing about the third axis to produce a roll motion. The third housing member is thus movable in accordance with the yaw, pitch and roll motions to provide for fine positioning of the end-effector carried by the third housing member.

Accordingly, an important object of the present invention is to provide a manipulator arm wrist joint having three degrees of freedom wherein the three degrees are provided about three mutually perpendicular axes of rotation having a common point of rotation.

Another important object of the present invention is the provision of a superior kinematic manipulator design wherein three degrees of freedom are provided in the last manipulator pivot joint which is as close as possible to the end-effector and wherein the last three degrees of freedom are provided about mutually perpendicular axes.

Another important object of the present invention is the provision of a wrist joint configuration for a space vehicle manipulator arm assembly having three degrees of freedom wherein the pitch movement is between plus and minus ninety degrees, the yaw movement is between plus and minus forty-five degrees, and the roll motion of the assembly is continuous.

Still another important object of the present invention is to provide a motor cluster assembly for use in a miniaturized wrist joint assembly which is capable of producing a required torque about each of the rotational axes.

Yet another important object of the present invention is to provide a wrist joint having three-degrees of freedom in rotation which is compact in size and affords a high degree of "see around" visibility to the remote operator of an end-effector carried on the end of the wrist joint.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a perspective view illustrating a teleoperator space vehicle having a pair of mechanical manipulator arm assemblies with end-effectors carried on the end thereof:

FIG. 1a is a perspective view illustrating a wrist joint assembly constructed in accordance with the present invention;

FIG. 1b is an exploded perspective view of a ball socket assembly constructed in accordance with the present invention which is rotatable about a first axis to produce a yaw motion;

FIG. 3 is a partial cut-away side elevational view illustrating the motor and gear arrangement for rotating the yaw motion assembly as constructed in accordance with the present invention;

FIG. 4 is an exploded perspective view of the pitch motion assembly of a wrist joint constructed in accordance with the present invention;

FIG 5 is a partial cut-way top plan view illustrating the motor and gear arrangement for the pitch drive assembly for producing the pitch motion in accordance with the present invention and wherein the view includes a second partial cut-away plane to illustrate the motor and gear drive arrangement for the roll drive assembly; and FIG. 6 is an exploded perspective view illustrating the assembly roll motion constructed in accordance with the present invention; and FIG. 7 is a partial cut-away perspective view of the slip ring member shown in FIGS. 5 and 6.

DESCRIPTION OF A PREFERRED EMBODIMENT

Figure 2:
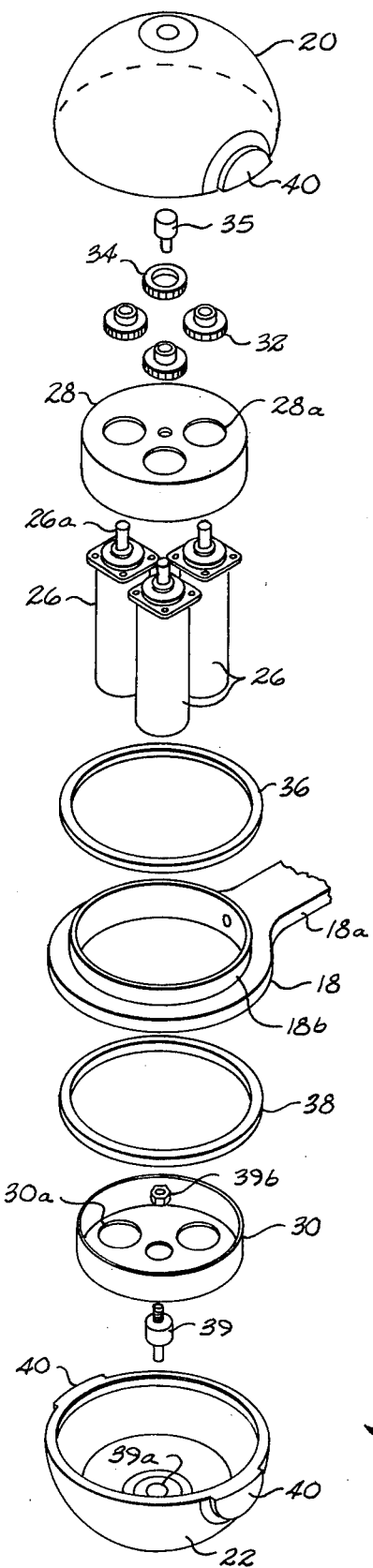
FIG. 2 is a exploded perspective view of a yaw motion for a wrist joint assembly constructed in accordance with the present invention.

A wrist joint, designated generally at A, is illustrated for use with a manipulator arm 10 such as on a teleoperator space vehicle 12. The wrist joint A may be utilized with manipulator arms on manned and unmanned space vehicles and other exploratory vehicles for performing space and planetary operators. The wrist joint A provides three degrees of freedom wherein the pitch motion is between plus minus 90°, the yaw motion is between plus and minus 45°, and the roll motion is continuous. An end-effector 14 is carried on the end of the wrist joint A for performing work such as grasping objects and docking. The position of the end-effector is determined by controlling the movement of the wrist joint A, remotely, as viewed from television camera 16.

The concept of a sphere is utilized to provide a fixed, common pivot point wherein the total freedom of motion relative to this point can be observed and formulated. This concept allows a rotation about the Z-axis to produce a yaw, around the Y-axis to produce a pitch, and around the X-axis to produce a roll motion. Three degrees of freedom are provided with the respective axis mutually orthogonal with respect to each other. The axes have a common point of origin at the center of spherical housing B which provides a common point about which each of the three rotational motions occurs.

Another advantage of this concept is the simplification of the mathematical equation which locates the sphere-center with respect to the coordinates of the shoulder joint 10a of the teleoperator vehicle. Such a concept lends itself to well defined guidance equations and precise maneuvering of the manipulator arm 10 and the end-effector 14 carried on the remote end of the wrist joint A. This is particularly important where the end-effector is controlled by man through a remote television camera.

To produce the yaw motion, a disk segment 18 having an arm member 18a attached to the terminal end of the manipulator arm and hence considered a fixed body, will allow two hemispherical shells 20 and 22 to rotate about the Z-axis which is also the axis of the disk. The two hemispheres 20 and 22 define a spherical housing member B within which the drive and gear mechanism are housed for effecting the yaw motion.

Another housing member C is made to rotate about the sphere B. The motion of pitch is derived by providing a pivot axis Y for the pitch motion. The pitch axis Y extends through the housing B and a pair of spaced arms 24 which are integral with the housing C so as to pivotably carry the shell C about the pivot axis.

The yaw and pitch motions have rotation axes which are at right angles to each other. To obtain the third axis at ninety degrees, a housing member D rotates about the shell member C to provide the required roll motion about the X-axis.

The drive assemblies for effecting the required rotation will now be described for a preferred embodiment. A torque of fifteen foot pounds is required per axis of rotation to adequately perform work with the end-effector 14.

Since a fifteen foot pound torque requirement is a rather demanding one, a DC motor with the lowest possible weight and highest order of driving torgue is required. One suitable motor is a DC motor Model No. A-2030 manufactured by the Globe Company. This motor is capable of producing a twelve hundred and fifty inch ounce torque which is 6.45 foot pounds. If three motors are clustered together to drive a central shaft and gear, the resultant torque output will be 19.35 foot pounds. This will be adequate to produce fifteen foot pounds torque under eighty percent of peak operating conditions. The total weight of each cluster of three motors is approximately thirty ounces which is very small for the amount of torque generated.

A yaw motion drive means is illustrated in the exploded parts assembly of FIG. 2. The drive means includes three motors 26 which are mounted within an upper cup member 28 and a lower cup member 30 which are, in turn, attached to the disk section 18 which is in the form of a center ring. The mounting cups 28 and 30 are respectively attached, such as by welding, to an upper and lower flange portion 18b and 18c of the disk segment 18. The motors are mounted within openings 28a and 30a and may be affixed in any suitable manner such as by spot welding. A plurality of spur gears 32 are carried on the motor output shafts 26a and mesh with a center gear 34 which is integrally attached to the upper hemisphere 20 by way of shaft 35 affixed to both. The gear 34 and upper hemisphere 20 rotate with respect to the center ring 18 about flange portion 18b through a bearing 36.

In a similar manner the lower hemisphere 22 rotates with respect to the center ring 18 on a bearing 38. Hence, with a center ring 18 affixed to the manipulator arm 10, which makes mounting cups 28 and 30 and the motors 26 fixed, the upper hemisphere 20 is permitted to rotate and provide the yaw motion.

The lower mounting cup 30 is also supported within shell 22 by means of a shaft 39 rotatably received in a bearing 39a and affixed to cup 30 by a nut 39b. The lower hemisphere 22 also rotates when connected to 20 as will be more fully explained hereinafter.

The spur gears 32 and the center gear 34 may be any suitable gear such as Berg gears P24S32-24 and F24S6-24, respectively.

A pair of raised hub portions 40 are defined on opposing sides of the spherical housing B when the hemispheres 20 and 22 are fitted on the disk segment 18. The raised hub portions 40 are provided for pivotably carrying a pitch motion assembly as is shown in the exploded view of FIG. 4. The pitch assembly includes a pair of side mounting plates 42 which are rigidly affixed over the raised hub portions 40 of the spherical shell B. Integrally attached to each side plate 42 such as by welding at recess 42a, is a ring gear segment 44. The side plates 42 and gear ring 44 are thus integrally affixed to raised hub portion 40 of the housing B. The arms 24 are rotatably mounted on flanges 42b of the plates 42 and rotate on bearings 46 in a pitch motion relative to the yaw housing B.

The raised hub portion 40 is defined by two half-circle shaped portions each of which is carried on the upper and lower hemispheres 20 and 22. It will be noted that the hemispheres are locked onto the disk segment when the side plates 42 are fitted over the entire circular hub portion 40 defined when the hemispheres are fitted together. In this manner, hemisphere 22 rotates on bearing 38 when hemisphere 20 rotates.

A drive means for driving the pitch motion assembly thus described will now be disclosed as illustrated in FIGS. 4 and 5. The housing C includes a gear housing 48 for enclosing the pitch motion drive assembly and includes spaced arms 24 integral therewith. Within the gear housing 48 is a cluster of three motors 50. The motors are mounted within an assembly cap 52 which is made integral with the housing 48. Three spur gears 54 are carried on the respective output drive shafts 50a of the motors 50 extending through openings 52a of cap 52. The three spur gears 54 mesh with and drive a center gear 56 which is attached to a central shaft 58. The shaft is journaled within a bearing 60 carried within a recessed portion 62 of the assembly cap member 52. Shaft 58 is maintained within the recess 62 by means of a keeper plate 64. A suitable gear for spur gears 54 and center gear 56 is Berg gear no. P20S35-30.

Also carried on shaft 58 in front of central gear 56 is a bevel gear 66 which drives another bevel gear 68. To prevent side loading and thus bending of the shaft 58, an idler bevel gear 70 is also provided. The bevel gears 68 and 70 are affixed to a shaft 72 which rotates in bearings 74. A pair of gears 76 (Berg gear no. P20S33-20) are fixedly carried adjacent opposing ends of the shaft 72 and mesh with the ring gear segments 44 so that the spaced arms 24 will rotate on bearings 46 and housing B. Hence, the gear housing 48 will rotate in a pitch motion relative to the spherical wrist ball B. The three bevel gears 66, 68, and 70 are preferably a matched set such as gear set M32P-6 manufactured by the Berg Co.

A roll motion drive means is illustrated in the exploded drive assembly of FIG. 6. It can be seen that the spacing of the three motors 50 allows for positioning of three other motors 78 which face in the opposite direction. A motor mounting cap 80, in which the motors 78 are mounted in openings 80a in any suitable manner, is rigidly connected to one end of a housing sleeve 82. This housing 82 is attached to the gear housing 48, such as by welding at 82a, and constitutes a fixed sleeve portion or extension of housing 48 which is movable in yaw as well as pitch rotation.

The roll housing D is provided by a cylindrical housing 84 rotatably carried on bearings 86 and 88 and rotates about the housing sleeve 82. An end cap 90 is affixed to the end of housing 82 having a central opening 90a formed therein through which a tubular guide shaft 92 extends. A central driven gear 94 is affixed to the end cap 90 which as by press fitting a flange portion 94a within recess 90b. The shaft 92 is affixed to the end cap member 90 by means of an end connector cap 96 and hence rotates with gear 94 and housing 84. A connector mounting plate 98, which fits within recess 90c, receives the connector cap 96 therethrough for making connection with the shaft 92. All of the parts may be joined by welding.

A ring plate 100 is provided with a plurality of holes 100a for encasing and additionally supporting the six motors including cluster 50 and cluster 78. The ring plate 100 also provides a mounting plate for a special slip ring member 102. The tubular shaft 92 is mounted upon the outer casing 102a of the slip ring 102 through O-rings 104. Thus, when the motors 78 are driven, spur gears 106 carried on the output drive shaft of the motors and meshing with the driven gear 94 will cause the driven gear 94 to rotate. This, in turn, will cause the housing 84 and shaft 92 to rotate as well as all of the assemblies that are attached thereto. In this manner the roll motion is provided.

The slip ring member 102, shown in more detail in FIG. 7, includes a flange 108 which is affixed to plate 100. A spindle 108a is integrally affixed to flange 108 and includes a plurality of conductive rings 108b. Power is supplied to the rings in a conventional manner through wires 109. An outer casing 102a rotates on the spindle 108a through bearings 110 and includes an inner layer 102b adjacent the bearings, and an outer layer 102c in which is embedded a plurality of brushes 102d which wipe the rings 108b in electrical contact as the casing rotates. A plurality of conductor wires 112, which carry the electrical power or signal from the brushes to the end-effector 14, are also embedded in the outer layer 102c.

It is noted that the tubular shaft 92 rotates the slip ring outer casing 102a by means of a friction drive provided by the pair of flexible O-rings 104. The O-rings may be any suitable resilient material such as rubber and such provides an expedient drive means for the slip ring 102 which is highly sensitive to bending and other forces which would possibly be encountered by a rigid connection between shaft 92 and outer casing 108a. Suitable slip ring members are manufactured by the Poly-Scientific division of Litton Industries as shown in slip ring catalog no. 75.

The end cap 96 may be provided with a suitable plug which can be connected to an electrical connector of the end-effector 14 carried on the end of housing 82 in a conventional manner. In this manner, signal and power transmission is provided to the end-effector while the wrist joint operates in a continuous roll manner.

The driven gear 94 and the driving spur gears 106 of the roll drive assembly may be any suitable gears such as Berg gears F20S20-40 and P20S33-15, respectively.

The cluster of motors 78 are preferably the same type motors 26 as used in the yaw drive assembly. All of the motor clusters are furnished power and control signals in a conventional manner from the remote teleoperator.

Thus, an advantageous construction for a wrist joint assembly can be had in accordance with the present invention which is capable of supplying a required torque on each of the three axes of rotation. The wrist joint construction provides structural integrity as compared to the relatively weak wrist joints in the prior manipulator designs while avoiding a bulky joint and improving the "see-around" visibility thereof. By utilizing a cluster of three gear train motors for supplying the drive to each axis of rotation, a triple redundancy is provided in case one of the motors fails.

While a preferred embodiment of the invention has been described using specific terms, such description is for illustrative purposes only, and it is to be understood that changes and variations may be made without departing from the spirit or scope of the following claims.

What is claimed is:

1. A wrist joint assembly for use with a mechanical manipulator arm for moving and finely positioning an end-effector carried by said wrist joint on the terminal end of said manipulator arm, said wrist joint assembly comprising:
   a disk segment having an outwardly extending arm affixed to the terminal end of said manipulator arm;
   a first housing member rotatably carried on said disk segment;
   first drive means connected between said first housing member and said disk segment for rotating said first housing member about a first axis coinciding with the axis of said disk segment to produce a yaw motion;
   a second housing member carried by said first housing member pivotable about a second axis normal to and intersecting said first axis.
   second drive means connected between said second and first housings for rotating said second housing member about said second axis to produce a pitch motion, said second housing being movable in both said yaw and pitch motions;
   a third housing member rotatably carried by said second housing about a third axis normal to the plane of said first and second axes so that said first, second, and third axis are mutually normal to each other and have a common point of origin;
   third drive means connected between said third and second housings for rotating said third housing about said third axis to produce a roll motion; and
   said third housing being movable in accordance with said yaw, pitch, and roll motions to provide for fine positioning of said end-effector carried by said third housing.

2. The assembly as set forth in claim 1 wherein said first housing member includes a raised hub portion on the opposing sides thereof, said second housing member including a pair of spaced arm members pivotably carried on said hub portions.

3. The assembly as set forth in claim 2 wherein said second drive means includes first gear means affixed to said hub portions and second gear means carried by said second housing member in meshing relationship with said first gear means, said spaced arm members being rotatably carried on said first gear means, and motor means for rotating said second gear means so as to cause said spaced arm members to rotate about said first gear means and said raised hub portions.

4. The assembly as set forth in claim 3 wherein said second gear means includes a shaft rotatably carried by said second housing member, a drive gear carried on said shaft for rotation therewith and meshing with said first gear means, a first bevel gear carried on said shaft for rotation therewith, a second shaft rotatably carried by said second housing having a second bevel gear affixed thereto in meshing relationship with said first bevel gear, and said second shaft being rotated by said motor means.

5. The assembly as set forth in claim 1 wherein said third housing member is rotatably carried about a fixed sleeve portion of said second housing member and rotates thereon.

6. The assembly as set forth in claim 5 wherein said third drive means includes a center gear connected to said third housing member, motor means carried within said sleeve portion having a drive gear means carried on an output drive shaft thereof in meshing relationship with said center gear.

7. The assembly as set forth in claim 5 wherein said assembly further comprises a slip ring member connected between said second and third housing members for providing signal and power transmission to said end-effector carried by said third housing member while said third housing member is movable in a continuous roll motion.

8. The assembly as set forth in claim 1 wherein said first drive means includes a center gear affixed to said first housing member, motor means carried within said first housing member, and drive gear means carried on an output shaft of said motor means meshing with said center gear for rotating said first housing member about said disk segment.

9. The assembly as set forth in claim 1 wherein said first housing member includes a pair of hemispherical shell members rotatably carried on opposing sides of said disk segment to define a spherical ball socket assembly for housing said first drive means.

10. A wrist joint assembly for use with a mechanical manipulator arm for positioning an end-effector carried by said wrist joint on the terminal end of said manipulator arm, said wrist joint assembly being pivotable about a first axis to produce a yaw motion, a second axis to produce a pitch motion, and a third axis to produce a roll motion, wherein said first, second, and third axes are mutually perpendicular to each other and have a common point of origin, said wrist joint assembly comprising:
   a disk segment having an outwardly extending arm fixed to the terminal end of said manipulator arm;
   a first housing member rotatably carried on said disk segment about said first axis, first drive means for rotating said first housing member about said first axis to produce said yaw motion;
   a second housing member rotatably carried on said first housing member, second drive means connected between said first and second housing for rotating said second housing about said second axis to produce said pitch motion;
   a third housing member rotatably carried on said second housing member, third drive means connected between said third and second housings for rotating said third housing about said third axis to produce said roll motion;

said first, second, and third drive means each including a first gear means affixed to each of said respective housing members, a plurality of motor members disposed in spaced-apart, parallel relation within said housing members and second gear means operatively connected to the output shafts of said motor members for meshing with and rotating said first gear means; and said motors being disposed to produce a required torque about each axis while enabling said housing members to be constructed of a reduced size so that said wrist joint assembly may be advantageously constructed to provide for good visibility around the joint.

11. The assembly as set forth in claim 10 wherein said yaw motion is between plus and minus 45°, said pitch motion is between plus and minus 90°, and said roll motion is continuous.

12. The assembly as set forth in claim 10 wherein said plurality of motor means includes three electrical motors, said second gear means includes a spur gear, and said first gear means includes a central spur gear meshing with each of said spur gears.

13. A wrist joint assembly for use with a mechanical manipulator arm for positioning an end-effector carried by said wrist joint adjacent the terminal end of said manipulator arm, wherein said wrist joint assembly is pivotable about a first axis to produce a yaw motion, a second axis to produce a pitch motion, and a third axis to produce a roll motion, said wrist joint assembly comprising:

a disk segment having an outwardly extending arm fixed to the terminal end of said manipulator arm;

a spherical housing member rotatably carried on said disk segment about said first axis, a motor means carried by said disk segment, first gear means rotatably driven by said motor means, second gear means fixed to said spherical housing and meshing with second gear means for rotating said spherical housing about said disk segment to produce said yaw motion;

a pair of spaced arm members pivotably carried on opposing sides of said spherical housing;

a pitch housing member affixed between said spaced arm members, motor means carried within said pitch housing, first gear means rotatably driven by said motor means, second gear means fixedly carried by said spherical housing and meshing with said first gear means so that rotation of said first gear means causes said pitch housing to rotate about said spherical housing to produce said pitch motion;

said pitch housing member having a cylindrical sleeve portion extending therefrom;

a roll housing member rotatably carried on said sleeve portion, motor means carried within said sleeve portion, first gear means rotatably driven by said motor means, second gear means affixed to said roll housing and meshing with said first gear means so as to cause said roll housing to rotate and produce said roll motion; and a slip-ring member having a spindle portion affixed within said pitch housing, an outer casing of said slip-ring rotatably carried on said spindle in electrical contact therewith, said outer casing being connected to said roll housing so as to rotate therewith, conductor means connected between said end-effector and said outer casing to transmit electrical power and signals to said end-effector carried on said roll housing during continuous roll motion.

* * * * *